No. 856,034. PATENTED JUNE 4, 1907.
J. N. CROUSE.
PROCESS OF MANUFACTURING FUSIBLE DENTAL FILLINGS, INLAYS,
AND CROWNS.
APPLICATION FILED MAR. 14, 1906.
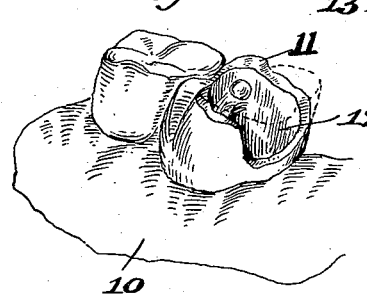
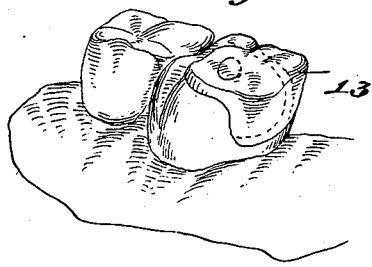
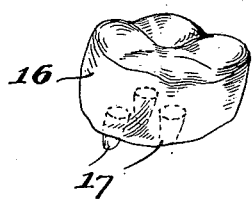
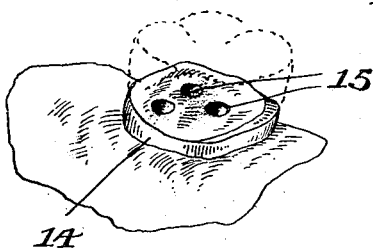
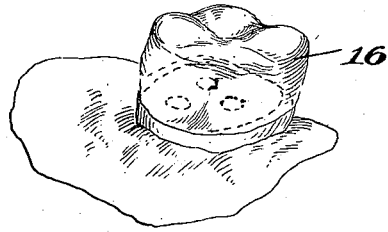
Witnesses,
F. S. Mann,
S. N. Pond
Inventor,
John N. Crouse,
By Offield, Towle & Linthicum
Atty's.

UNITED STATES PATENT OFFICE.

JOHN N. CROUSE, OF CHICAGO, ILLINOIS.

PROCESS OF MANUFACTURING FUSIBLE DENTAL FILLINGS, INLAYS, AND CROWNS.

No. 856,034.　　　Specification of Letters Patent.　　　Patented June 4, 1907.

Application filed March 14, 1906. Serial No. 306,081.

*To all whom it may concern:*

Be it known that I, JOHN N. CROUSE, a citizen of the United States, residing at Chicago, in the county of Cook and State of Illinois, have invented certain new and useful Improvements in Processes of Manufacturing Fusible Dental Fillings, Inlays, and Crowns, of which the following is a specification.

My invention relates to improvements in fillings, inlays and crowns for teeth, and has reference more particularly to a new method or process of manufacturing a composite substance adapted for the above-named uses.

In the matter of restoration materials for teeth, a variety of considerations have to be taken into account, principal among which are (a) strength; (b) durability; (c) appearance; (d) molding quality; (e) glazing effect; and (f) freedom from shrinkage. Ordinary porcelain, at present extensively employed for these purposes, is largely deficient in strength; and, while rating high as regards appearance, is often injured by reason of the cement showing through. Many of the amalgams now in use rate high as regards strength and durability, but are clearly deficient in respect to appearance, being dark and entirely out of color harmony with the natural tooth.

The object of my invention is to produce a composite substance that shall combine in as perfect a degree as possible all of the various desiderata above specified; and such a material I have discovered, as a result of numerous and long continued experiments, in a composition having as its essentials feldspar, silex, and one or more metal oxids; the oxids yielding the best results being tin oxid and zinc oxid, both of which are preferably employed in the composition. As regards the relative amounts of these ingredients, I have tested several formulas, all of which give good results, and some being superior to others in one or more of the desirable qualities above enumerated, according to the relative amounts of the different ingredients employed.

Without attempting to name all of the formulas which may be employed advantageously and within the purview of the invention, I will define several, it being understood that the proportionate parts named are approximate only and not necessarily absolute.

Formula 1. Feldspar 96; silex 13; tin oxid 100; zinc oxid 50.

Formula 2. Feldspar 96; silex 13; tin oxid 100; zinc oxid 100.

Formula 3. Feldspar 96; silex 13; tin oxid 200; zinc oxid 100.

Formula 4. Feldspar 96; silex 13; tin oxid 400; zinc oxid 100.

Formula 5. Feldspar 100; silex 13; tin oxid 50; zinc oxid 50.

The amounts above given express the relative quantities by weight of the ingredients. It will be observed that in all of the formulas the amounts of feldspar and silex are substantially constant; the variations being in the relative amounts of the metal oxids. Of the oxids named the tin oxid is of the greater importance, as it constitutes the principal strength-giving element, besides enhancing the glazing effect, and limiting the shrinkage that occurs upon baking or fusing.

Referring now to the manner in which the ingredients are united and formed into a filling, inlay or crown, it may be stated that at the outset each of the ingredients, excepting the feldspar, is preferably subjected to a heat ranging from 2200 to 2800 Fahrenheit. The ingredients are then finely ground and thoroughly mixed together. The dry composition thus formed is then mixed with a liquid comprising phosphoric acid and water. Preferably a liquid mixture of phosphoric acid of specific gravity 80 with an equal weight of water is employed; and any suitable coloring may be added if desired, among the coloring matters being mentioned iron phosphate, red oxid of iron, black oxid of iron, lead dioxid, cobalt oxid nickel oxid, platinum black, black copper oxid and red copper oxid; one or more of these being added according to the tint or color effect desired. The material is mixed to a plastic form, and, the cavity having previously been coated with some oily substance, it is molded into the cavity of the natural tooth, or of a reproduction thereof, after which it is fused or enameled by baking. This latter operation produces a certain shrinking or contraction, making it necessary to refit the filling or inlay to the cavity, which is done by applying to the cavity-contacting surface thereof a thin coating of the original or similar plastic material, and again impressing the filling or inlay thus coated into the cavity, removing it before the coating hardens, trimming off the surplus and again baking it but not to the fusing or enameling point.

This leaves a sufficiently rough cavity-contacting surface on the filling or inlay to suitably co-operate with the cement by which the latter is permanently secured in the cavity.

A composition material according to any of the above formulas fuses only at a comparatively high heating point, necessitating the use of an oven capable of affording a sufficiently high heat to effect such fusing. I have discovered that the material will be rendered fusible at a considerably lower temperature when mixed with a flux; and accordingly where the capacity of the oven is limited or, for other reasons, a very high baking temperature is undesirable or impossible, I mix with the composition a suitable flux and use the resulting composition in the manner already set forth. A flux composed of fluorid of sodium, and fluorid of aluminium, mixed in the proportions of 25.2 parts by weight of the former to 17.8 parts by weight of the latter gives good results.

In order to make clearer the uses and applications of my novel dental material, I have illustrated the same by the accompanying drawing, in which,—

Figure 1 represents a section of a jaw containing a molar prepared for filling, or an artificial reproduction thereof; Fig. 2 represents the filling or inlay detached as molded and ready to be cemented in the tooth; Fig. 3 is a view similar to Fig. 1 showing the filling or inlay cemented in place in the molar; and Figs. 4, 5 and 6 are views corresponding with Figs. 1, 2 and 3, respectively, but showing my novel dental material employed for the purpose of a crown.

Referring to the drawings, 10 may designate a section of the jaw or an artificial reproduction thereof, and 11 a molar therein containing a large excavated cavity 12 prepared for filling.

13 designates an inlay or filling fitted and prepared as hereinabove described; the same being shown as applied to the tooth in Fig. 3.

In Figs. 4 and 6, 14 designates a root, or an artificial reproduction thereof, suitably prepared to receive a crown; 15 designating the pulp cavities therein which may receive anchoring pins on the base of the crown. 16 designates the crown itself, made of the materials and in the manner above described and equipped with anchoring pins 17 adapted to fit the holes 15. Fig. 6 shows the crown secured in place on the root. The anchoring pins may, of course, be omitted.

I claim:

1. A process of manufacturing dental filling and crowning material which consists in mixing ground feldspar, silex, and one or more metal oxids; reducing them to a plastic condition by the addition of phosphoric acid and water; molding the paste thus formed to the tooth; and then baking and fusing the same.

2. A process of manufacturing dental filling and crowning material, which consists in mixing ground feldspar, silex, and one or more metal oxids; reducing them to a plastic condition by the addition of phosphoric acid and water; molding the paste thus formed to the tooth; then baking and fusing the same; then applying a thin coating of the same plastic material; then refitting the coated filling to the tooth; and finally rebaking the same to less than a fusing heat.

3. A process of manufacturing dental filling and crowning material, which consists in preliminarily subjecting silex and one or more metal oxids to a temperature of from 2200 to 2800 Fahrenheit; then mixing the same with ground feldspar; then reducing the mixture to a plastic condition by the addition of phosphoric acid and water; then molding the mixture to the tooth; and then baking and fusing the same.

JOHN N. CROUSE.

Witnesses:
SAMUEL N. POND,
L. F. McCREA.